United States Patent [19]

Sagar

[11] Patent Number: 5,738,881
[45] Date of Patent: Apr. 14, 1998

[54] ANNULAR CO-EXTRUSION DIE

[75] Inventor: Surendra M. Sagar, Mississauga, Canada

[73] Assignee: Macro Engineering & Technology Inc., Mississauga, Canada

[21] Appl. No.: 759,911

[22] Filed: Dec. 4, 1996

Related U.S. Application Data

[63] Continuation of Ser. No. 572,454, Dec. 14, 1995, abandoned.

[51] Int. Cl.$^6$ .................... B29C 47/06; B29C 47/28
[52] U.S. Cl. .................... 425/133.1; 425/462
[58] Field of Search .................... 425/462, 131.1, 425/133.1; 264/209.8

[56] References Cited

U.S. PATENT DOCUMENTS

| | | | |
|---|---|---|---|
| 4,522,775 | 6/1985 | Briggs et al. | 425/133.1 |
| 4,578,025 | 3/1986 | Ando et al. | 425/133.1 |
| 4,838,778 | 6/1989 | Becker et al. | 425/133.1 |
| 4,889,477 | 12/1989 | Wortberg et al. | 425/133.1 |
| 5,069,612 | 12/1991 | Teutsch | 425/133.1 |
| 5,262,119 | 11/1993 | Smith | 425/133.1 |

*Primary Examiner*—Khanh P. Nguyen
*Attorney, Agent, or Firm*—Rogers & Scott

[57] ABSTRACT

An annular co-extrusion die for extruding multi-layer tubular plastic film has a lower part and an upper part. The lower part has concentric radially spaced lower die members of different diameters forming at least two lower concentric radially spaced annular passages communicating with a common annular passage for separately feeding different plastic materials along the lower annular passages to the common annular passage for extrusion therefrom. The upper part has upper annular die members located above the lower die members and stacked one upon another. The upper annular die members forms at least one upper annular passage for separately feeding different plastic materials along each upper annular passage to the common annular passage for extrusion therefrom with the plastic materials from the lower annular passages as a multi-layer tubular plastic film.

4 Claims, 3 Drawing Sheets

ANNULAR CO-EXTRUSION DIE

This application is a continuation of the application having Ser. No. 08/572,454 filed on Dec. 14, 1995, and now abandoned.

FIELD OF THE INVENTION

This invention relates to annular co-extrusion dies for extruding multi-layer tubular plastic film.

DESCRIPTION OF PRIOR ART

Such extrusion dies have been known for many years. Conventional dies of this kind usually have a series of concentric radially spaced die members of different diameters which define concentric radially spaced annular passages for separately feeding different plastic materials to a common annular passage such that a multi-layer of tubular plastic film is extruded therefrom. These conventional dies are satisfactory for producing tubular plastic film with up to about three layers.

However, there are present day requirements for plastic film with a greater number of layers. The conventional concentric radially spaced die member design described above is not satisfactory for more than about three layers because of the resultant large diameter of the die and difficulty in controlling the temperatures of the different plastic materials individually. Also, such dies cannot readily be modified to vary the number of layers.

In recent years, multi-layer co-extrusion dies have been made with die members stacked one above the other to form annular feed passages for the different plastic materials. Such dies have advantages over the conventional concentric radially spaced die member design in that they can be more easily modified to vary the number of layers. Also, the temperature of the different plastic materials can be better controlled and the die diameter does not increase with the number of layers. However, the height increases with the number of layers, and this results in the disadvantage that the plastic material which flows through annular passages formed by lower die members in the stack has to travel longer distances than the plastic material which flows through annular passages formed by higher die members in the stack. This can cause problems in obtaining a satisfactory multi-layer tubular plastic film.

It is therefore an object of the invention to provide an annular co-extrusion die for extruding multi-layer tubular plastic film which at least partially overcomes the disadvantages of previously known dies with concentric radially spaced die members or with stacked die members.

SUMMARY OF THE INVENTION

According to the present invention, an annular co-extrusion die for extruding multi-layer tubular plastic film has a lower part and an upper part. The lower part has concentric radially spaced lower die members of different diameters forming at least two lower concentric radially spaced annular passages communicating with a common annular passage for separately feeding different plastic materials along the lower annular passages to the common annular passage for extrusion therefrom, and the upper part has upper annular die members located above the lower die members and stacked one upon another, the upper annular die members forming at least one upper annular passage for separately feeding different plastic materials along each upper annular passage to the common annular passage for extrusion therefrom with the plastic materials from the lower annular passages as a multi-layer tubular plastic film.

An extrusion die in accordance with the invention provides substantial flexibility for the manufacture of multi-layer plastic film. The number of layers can readily be varied by varying the number of stacked upper die members, and the disadvantages of known co-extrusion dies described above are minimized. Also, the upper die members may be removed if desired and the lower arrangement of concentric radially spaced die members of different diameters used by itself.

The lower part may have at least four lower concentric radially spaced die members forming at least three lower concentric radially spaced annular passages, and the upper part may have at least three upper annular die members forming at least two upper annular passages. At least one of the lower annular passages may be supplied with plastic material through a passage extending in a radially inwardly direction from a radially outer surface of the die. Alternatively or additionally, at least one of the lower annular passages may be supplied with plastic material through a passage extending in an upwards direction from a lower end of the die.

At least one of the upper annular passages may be supplied with plastic material through a passage extending in a radially inwardly direction from a radially outer surface of the die.

BRIEF DESCRIPTION OF THE DRAWING

Embodiments of the invention will now be described, by way of example, with reference to the accompanying drawings, in which.

DESCRIPTION OF THE PREFERRED EMBODIMENTS

Figure 1:
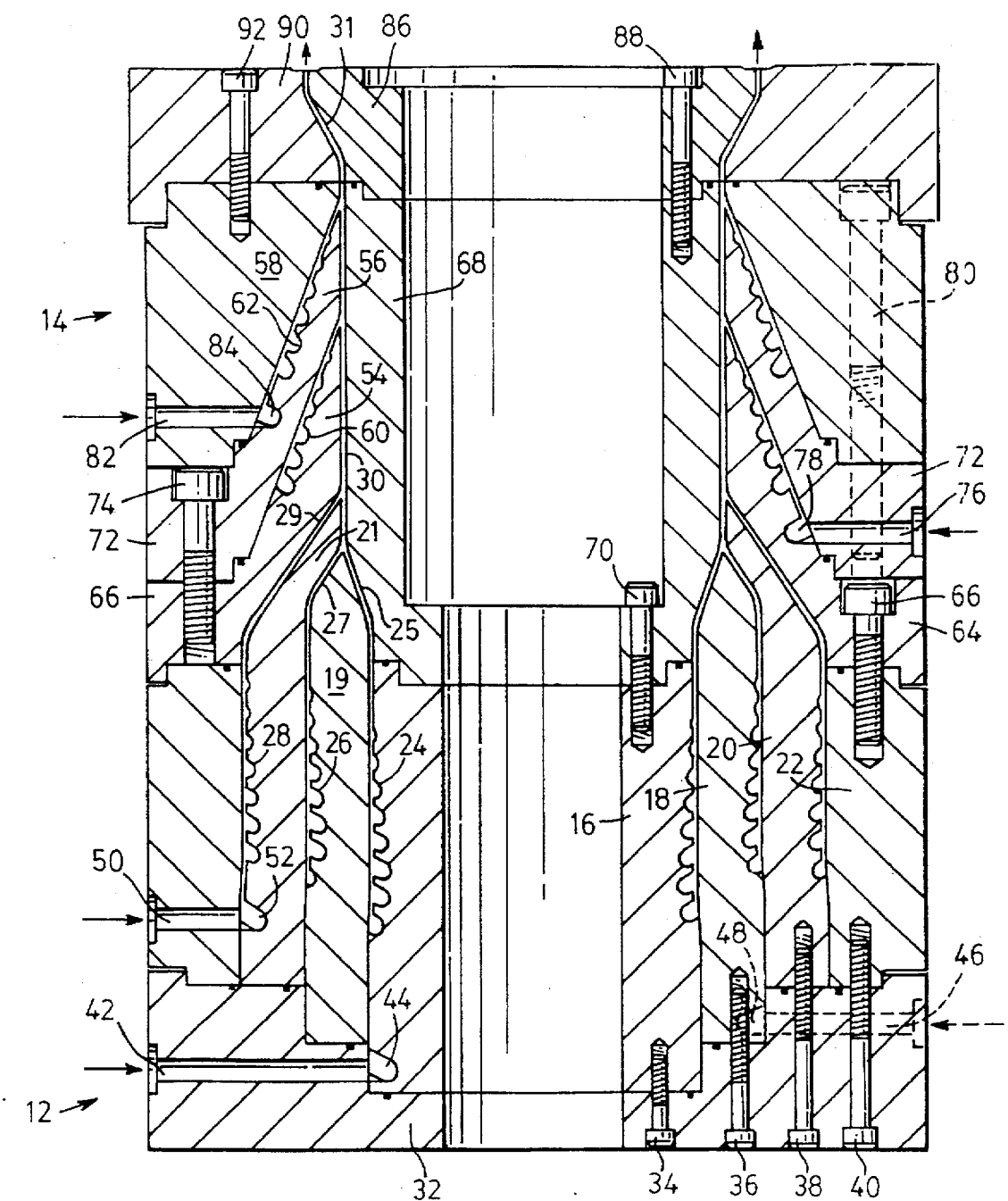
FIG. 1 is a vertical sectional view of an annular co-extrusion die in accordance with one embodiment of the invention.

Referring to the drawings, FIG. 1 shows an annular co-extrusion die with a lower part 12 and an upper part 14. The lower part 12 has four concentric radially spaced lower annular die members 16, 18, 20, 22 of different diameters forming three lower concentric helical annular passages 24, 26, 28 communicating with a common central annular passage 30. The lower die members 16, 18, 20, 22 are mounted on a base ring 32 and bolted thereto by bolts 34, 36, 38 40.

The lower annular passage 24 is supplied with plastic material through a passage 42 which extends radially inwardly through the base ring 32 from the radially outer surface thereof to a groove 44 in the lower annular member 16. The groove 44 communicates in a helical manner (not shown) with the lower end of the helical passage 24 in a manner which will be readily apparent to a person skilled in the art. The lower annular passage 26 is supplied with plastic material through a similar radially inwardly extending passage 46 and groove 48 in base ring 32 and lower annular member 18 respectively. The lower annular passage 28 is supplied with plastic material through a passage 50 which extends radially inwardly through the outer annular member 22 from the radially outer surface thereof to a groove 52 in the lower annular member 20.

The upper part 14 has three upper annular die members 54, 56, 58 located above the lower die members 16, 18, 20, 22 and stacked one above the other to form two upper helical annular passages 60, 62. The upper die member 54 has a generally frusto-conical shape with a flange portion 64 at its lower end which is seated on top of the lower annular die member 22 and secured thereto by circumferentially-spaced bolts 66 (only one of which is shown).

The main portion of lower annular die member 20 extends upwardly into an inwardly inclined upper portion 21 which extends close to the first upper die member 54 to form an annular passage 29 of frusto-conical shape extending from the annular passage 28 to the common annular passage 30. The main portion of lower die member 18 extends upwardly into a tapering upper portion 19 which extends close to the upper portion 21 of die member 20 to form an annular passage 27 of frusto-conical shape extending from the annular passage 26 to the common annular passage 30.

An inner tubular member 68 seated on top of lower die member 16 extends upwardly to the upper end of upper die member 58 and has an upper outer surface which forms the radially inner surface of central common annular passage 30. The inner tubular member 68 also has a lower outer surface which extends close to a radially inner surface of portion 19 of lower die member 18 to form an annular upwardly and outwardly inclined annular passage 25 extending from the helical passage 24 to the common annular passage 30. The inner tubular member 68 is secured to the lower annular member 16 by circumferentially spaced bolts 70.

The upper die member 56 is of somewhat similar shape to the die member 54 and has a generally frusto-conical shape with a flange portion 72 at its lower end which is seated on top of the flange portion 64 of the die member 56 and secured thereto by circumferentially spaced bolts 74. The upper annular passage 60 is supplied with plastic material through a passage 76 which extends radially inwardly through the flange portion 72 from the radially outer surface thereof to a groove 78 in the die member 54.

The annular member 58 has an upwardly and inwardly inclined inner wall which extends close to the frusto-conical portion of the annular member 56 to form the helical passage 62, and a lower end which is seated on the flange portion 72 of the annular member 56 and secured thereto by circumferentially spaced bolts 80. The annular passage 62 is supplied with plastic material through a passage 82 which extends radially inwardly through the die member 58 from the radially outer surface thereof to a groove 84 in the die member 56. The common annular passage 30 is formed between the radially outer surface of the inner tubular member 68 and the radially inner surfaces of the upper die members 54, 56.

The die also has an upper tubular member 86 seated on top of the inner tubular member 68 and bolted thereto by circumferentially spaced bolts 88, and an upper ring member 90 seated on top of the annular die member 88 and bolted thereto by circumferentially spaced bolts 92. The inner surface of ring member 90 and the outer surface of tubular member 86 define an extension 31 of common passage 30 which extends to the upper end of the die.

The die described with reference to FIG. 1 is used to extrude tubular plastic film with five layers, the inner three layers originating from the annular passages 24, 26, 28 in the lower part 12 and the outer two layers originating from the annular passages 60, 62 in the upper part 14. The convenience and other advantages of this embodiment will be readily apparent to a person skilled in the art. If it is desired to produce plastic film with more than five layers, further upper die members may be stacked on the die member 56. Similarly, if only a four layer film is desired, the upper die member 56 may be removed.

Figure 2:
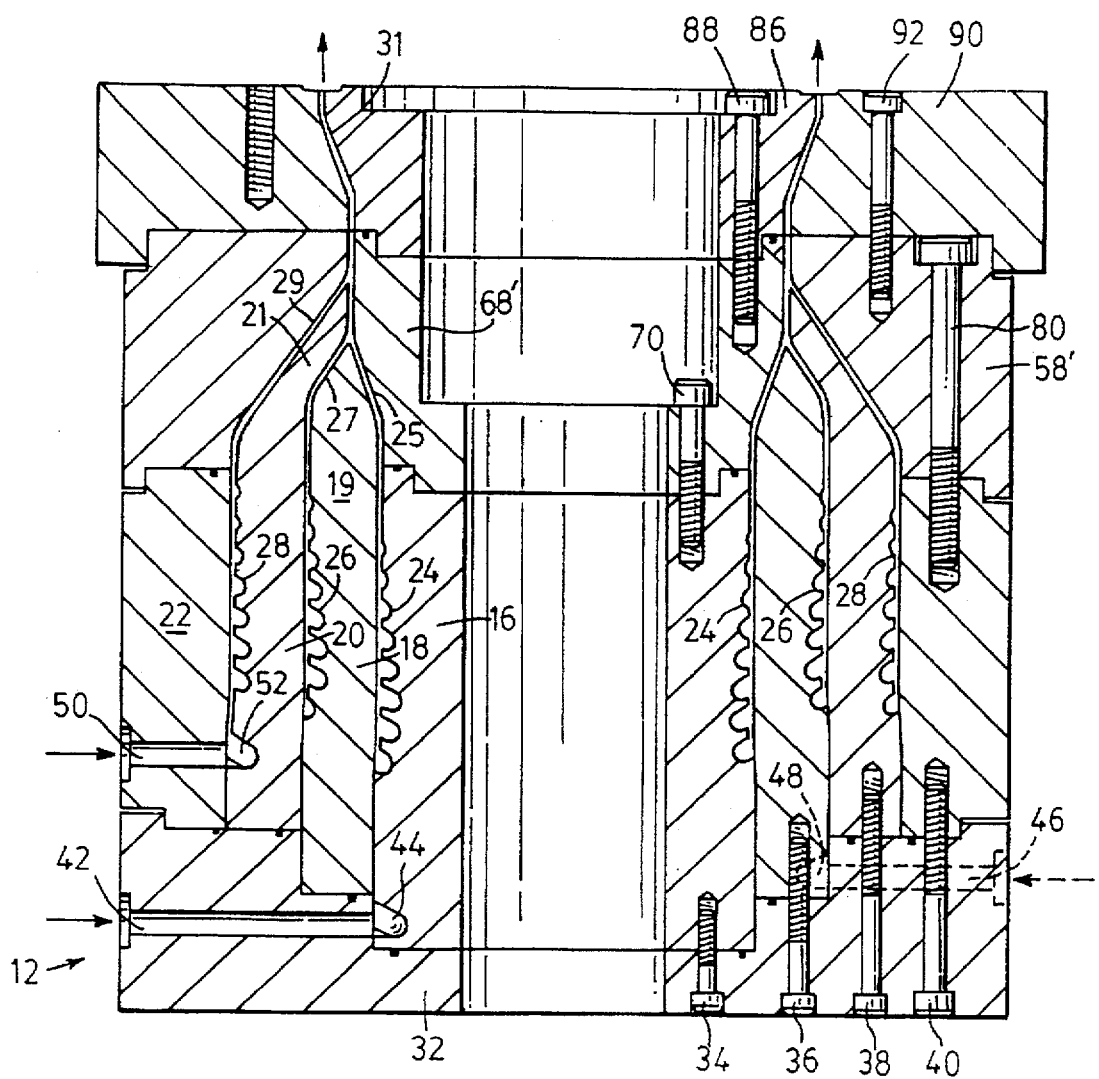
FIG. 2 is a similar view showing the extrusion die of FIG. 1 with the upper stacked die members removed to form a conventional die with concentric radially spaced die members of different diameters.

Also, the die may be easily modified to produce a three layer tubular film, it merely being necessary to remove the upper die members 54, 56, 58 and to use a slightly different upper annular die member 58' at a time and a slightly different inner tubular member 68' as shown in FIG. 2.

Figure 3:
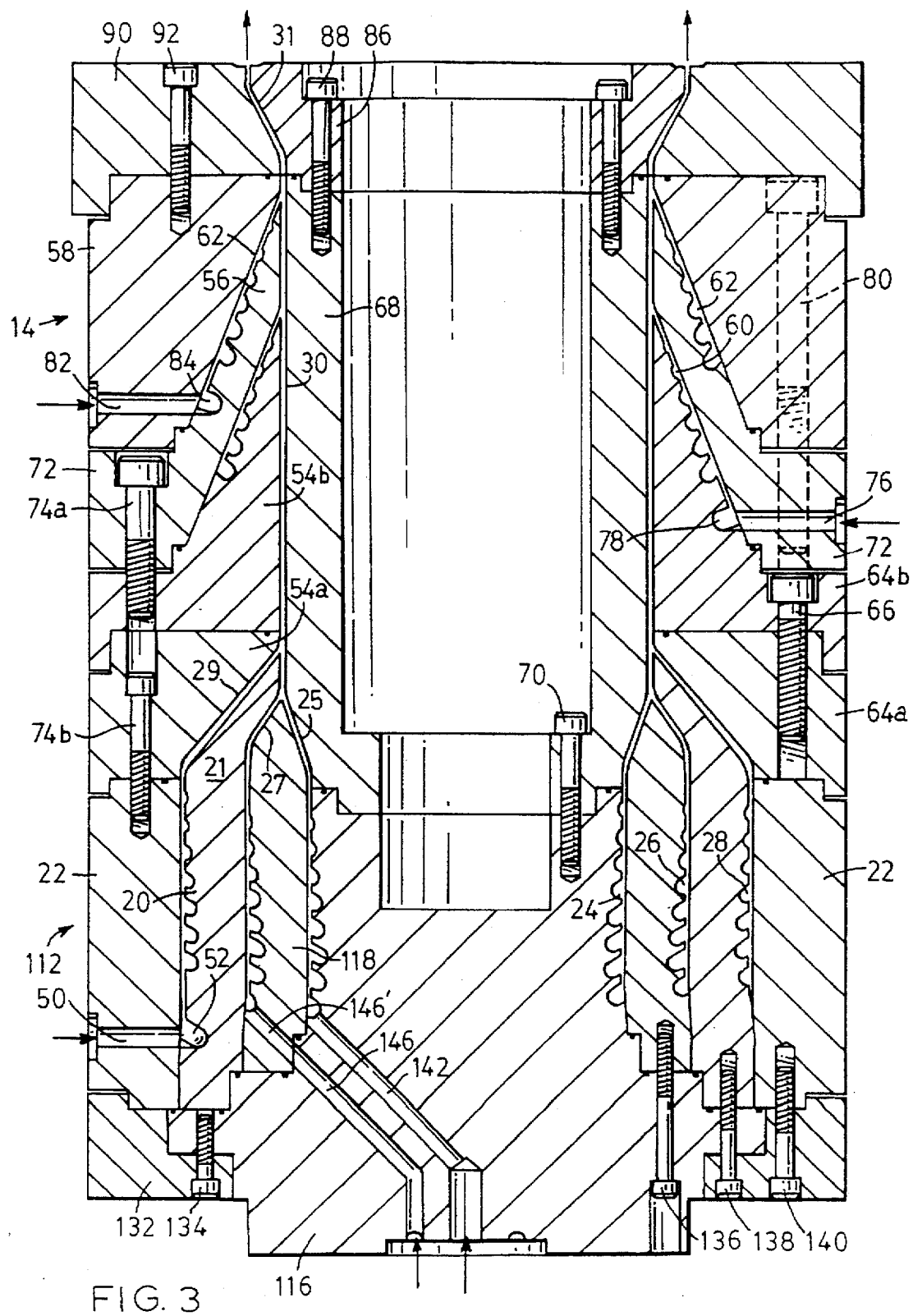
FIG. 3 is a similar view of an annual co-extrusion die in accordance with a second embodiment of the invention.

FIG. 3 shows a second embodiment of the invention which is similar in many respects to the embodiment of FIG. 1. For simplicity of description, the same reference numerals will be used for the same or similar parts.

The primary difference is the supply of plastic material to the annular helical passages 24, 26. Instead of the supply being along radially inwardly extending passages as in the previous embodiment, the supply in the embodiment of FIG. 3 is through passages 142, 146 extending in an upwardly and outwardly inclined direction in a central lower die member 116. The passage 142 extends from a central position in the bottom of the die member 116 to the lower end of the annular passage 24. The passage 146 extends from a slightly off-centre position on the bottom of the die member 116 to the lower annular member 118, which has an extension 146' of passage 146 communicating with the annular passage 26. The lower die member 116 is supported by lower ring member 132 bolted to other components by bolts 134, 136, 138, 140 as shown.

Other embodiments of the invention will be clearly apparent to a person skilled in the art, the scope of the invention being defined in the appended claims.

I claim:

1. An annular co-extrusion die for extruding multi-layer tubular plastic film, said die having a longitudinal axis and comprising:

a lower part and an upper part, said lower part having at least four concentric radially spaced lower die members of different diameters with surfaces parallel to said longitudinal axis forming at least three lower concentric radially spaced annular helical passages communicating with a common annular passage for separately feeding different plastic materials along the lower annular passages to the common annular passage for extrusion, and said upper part having upper annular die members located above the lower die members and stacked one upon another, said upper angular die members having frusto-conical surfaces inclined towards said longitudinal axis forming at least two upper frusto-conical helical passages for separately feeding different plastic materials along each upper frusto-conical helical passage to the common annular passage for extrusion therefrom with the different plastic materials from the lower annular passages as a multi-layer tubular plastic film.

2. A co-extrusion die according to claim 1 wherein at least one of the lower annular helical passages is supplied with plastic material through a supply passage extending in a radially inwardly direction from a radially outer surface of said die.

3. A co-extrusion die according to claim 1 wherein at least one of the lower annular helical passages is supplied with plastic material through a passage extending in an upwards direction from a lower end of said die.

4. A co-extrusion die according to claim 1 wherein at least one of the upper frusto-conical helical passages is supplied with plastic material through a passage extending in a radially inwardly direction from a radially outer surface of said die.

* * * * *